Oct. 10, 1944. H. S. MACADIE ET AL 2,359,779
OHMMETER
Filed Jan. 18, 1940 3 Sheets-Sheet 1

Hugh Sutherland Macadie
Hans Fraenkel
INVENTORS
By their ATT'Y.

Oct. 10, 1944.  H. S. MACADIE ET AL  2,359,779
OHMMETER
Filed Jan. 18, 1940  3 Sheets-Sheet 2

SELECTIVE RANGE SWITCH

Hugh Sutherland Macadie
Hans Frankel
INVENTORS

By Otto Munk
their ATTY.

Oct. 10, 1944.    H. S. MACADIE ET AL    2,359,779
OHMMETER
Filed Jan. 18, 1940    3 Sheets-Sheet 3

Hugh Sutherland Macadie
Hans Fraenkel
INVENTORS

Patented Oct. 10, 1944

2,359,779

UNITED STATES PATENT OFFICE 2,359,779

OHMMETER

Hugh Sutherland Macadie and Hans Fraenkel, Westminster, London, England, assignors to The Automatic Coil Winder & Electrical Equipment Company Limited, Westminster, London, England, a British company Application January 18, 1940, Serial No. 314,428
In Great Britain January 18, 1939

4 Claims. (Cl. 171—95)

This invention relates to improvements in direct reading ohmmeters of the moving coil type employing "crossed coils," viz., a current coil and a voltage coil rigidly secured together at an angle and free to swing in annular air gaps between the polar faces of a permanent magnet and the central stationary iron core. Ohmmeters of this type have heretofore been arranged to read more than one range of resistance values but, to the best of our knowledge and belief, in all cases where low resistance as well as high resistance (megohms) can be measured, there has been one or more gaps in the ranges of resistances that could be measured in the instruments heretofore proposed. The chief object of the present invention is to overcome this disadvantage and to provide an improved multirange direct reading ohmmeter by means of which any value of resistance from, say, one ohm or less up to 10 megohms or more may be easily measured.

The ohmmeter according to the principal feature of the present invention is characterised in that on the high value range and at least one of the intermediate ranges the unknown resistance is connected in series with the current coil of the crossed coil system whilst, on the lowest range, the unknown resistance is connected in parallel with the current coil of the crossed coil system, the change from any one range to another being effected by means of a single switch without the alteration of the terminals to which the unknown resistance is connected, and the arrangement being, furthermore, such that on the high range a high voltage is supplied to the resistance to be measured by means of a vibrator rectifier system whilst, on the intermediate and lowest ranges, the voltage supplied to the resistance to be measured is a low voltage one of the order of 1.5–15 volts.

Several additional novel and advantageous features are provided by the present application, these being fully described hereinafter and claimed in the appended claims.

In order that this invention may be the more clearly understood and readily carried into effect, we will proceed to describe the same with reference to the accompanying drawings, which illustrate by way of example the application of the present invention to a four-range direct reading ohmmeter with ranges extending from approximately 0.1 ohm to 50 megohms and overlapping each other to such an extent that any resistance from approximately .5 ohm to 10 megohms may be measured with fair accuracy, and in which.

Figure 1:
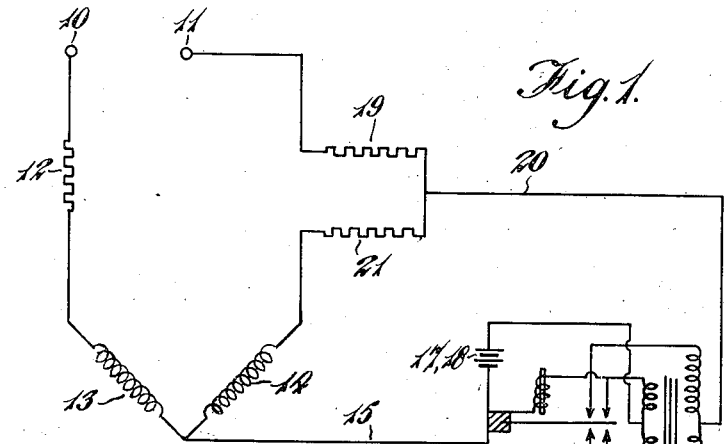
Figure 1 is the effective circuit diagram for the high value range of resistance measurements.
Figure 2:
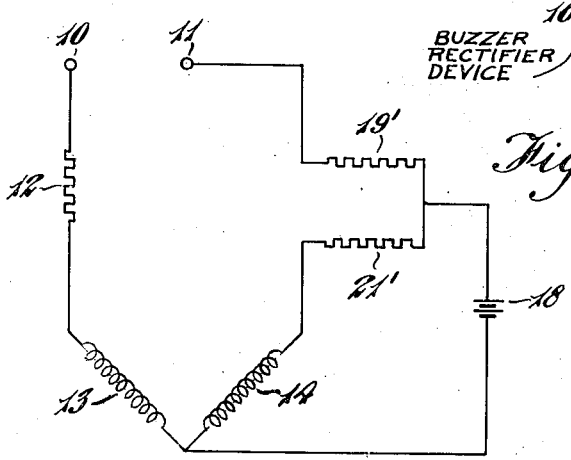
Figure 2 is the effective circuit diagram for the higher of the two intermediate ranges.
Figure 3:
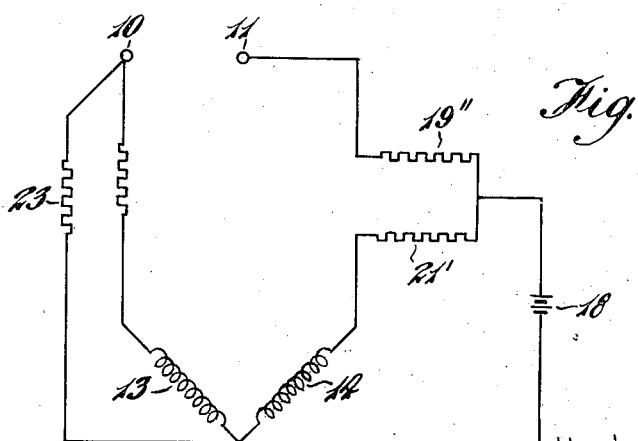
Figures 3 and 4 are like circuit diagrams for the lower of the two intermediate ranges and the low range respectively.

Referring now to the drawings, on the high range shown in Figure 1, one, 10, of the terminals 10, 11 for the connection of the unknown resistance is connected through a supplementary resistance 12 and the current coil 13 of the crossed coil moving coil system 13, 14 to one of the leads 15 of a high voltage supplied by a buzzer rectifier device 16 fed by a low voltage supply, 17, 18 and delivering, say, 500 volts. The other terminal 11 for the connection of the unknown resistance is connected through a safety or current limiting resistance 19 to the other lead 20 of the said supply, whilst the pressure coil 14 of the crossed coil movement 13, 14 is connected in series with a resistance 21 and shunted across the high voltage supply. On the higher of the two intermediate ranges, as shown in Figure 2, the circuit is the same as for the high range, with the exception that different values of series resistances 19′, 21′ are employed and the voltage 22 supplied to the resistance to be measured instead of being the high voltage supplied by the buzzer rectifier device 16 is the ordinary low voltage 18 (or a part of it) which, on the high range, is used to supply the said device. It may conveniently be provided by two 4½ volt dry batteries. On the lower of the intermediate ranges (Figure 3) the circuit is similar to that employed on the higher intermediate range, with the exception that a different value of series resistance 19″ is employed and the current coil 13 is shunted by a resistance 23.

On the low range (Figure 4) the unknown resistance across the terminals 10, 11 instead of being connected in series with the current coil 13 of the crossed coil system 13, 14 is connected in parallel with the same. One of the external connections for the unknown resistance (that which was previously connected to the current coil, i. e., the terminal 10), is connected to the common point of the crossed coil system 13, 14 and the other end of the current coil is connected through the supplementary resistance 12 to the other of the external connections for the unknown resistance, i. e., the terminal 11.

Figure 5:
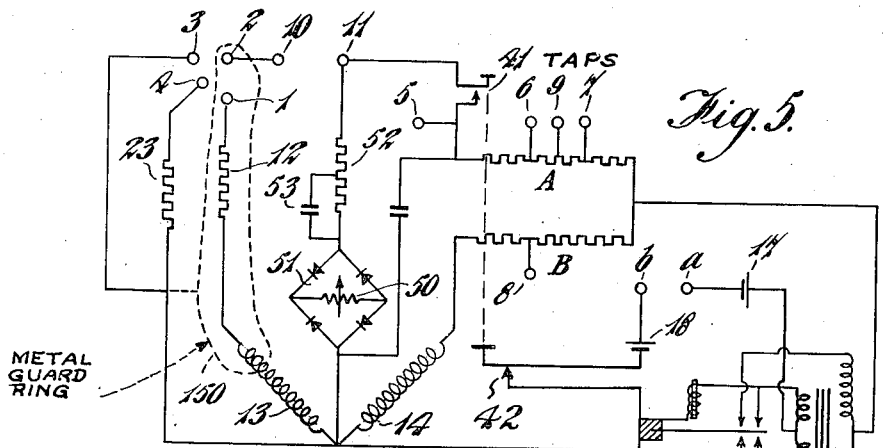
Figure 5 is the complete circuit diagram of the instrument.
Figure 6:
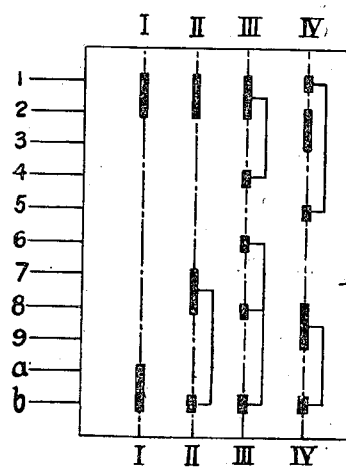
Figure 6 is a diagram of the switching device, the switch contacts being shown diagrammatically in developed elevation.

Such an arrangement is shown in Figure 5, which is the circuit diagram of the complete instrument according to the present invention. Figure 6 shows the switching diagram which is to be read in conjunction with Figure 5. Like references have been used in Figure 5 to those used in Figures 1 to 4 for the sake of clearness. It will be seen that the different resistances 19, 21; 19', 21' and 19", shown in Figures 1 to 4 have been combined into two resistances A and B which are tapped off at 6, 7 and 9 along the resistance A and at 8 on resistance B, these tappings being connected to the switch shown in Figure 6 where the various contacts are indicated as lines to one side of the developed elevation of the switch body and the lines being numbered to agree with the points in the circuit diagram of Figure 5 to which they are connected. The connection from the test terminal 10 to the current coil 13 of the crossed coil system is broken between the test terminal and the supplementary resistance to provide two contacts 1 and 2 which are connected to the switch. The common point of the crossed coil system is connected to contact 3 on the switch and this point is also connected to the contact 4 through the resistance 23. The circuit also includes two pairs of blade spring contacts 41 and 42 which are adapted to be simultaneously operated by means of a common press button on the instrument. The former pair of blade spring contacts 41 is included in the connection from the test terminal 11 to the resistance A, whilst the second pair of contacts 42 is included in the battery supply circuit as shown. A connection is made from the lower blade of the contacts 41 to contact 5 on the switch, and the remaining contacts a and b of the switch are connected in the supply circuit of the buzzer rectifier device 16.

The four positions of the switch are shown by the chain lines I—I, II—II, III—III and IV—IV and correspond to Figures 1 to 4 respectively. In the first position the contacts on the switch are adapted to short circuit the contacts 1 and 2 and also a and b leaving the other contacts free. This will give the circuit of Figure 1, as will be readily appreciated. In the second position the contacts of the switch are adapted to short circuit contacts 1 and 2 and contacts 7, 8 and b which will cut out the buzzer rectifier device 16 and establish the circuit of Figure 2. In the third position, the switch is adapted to short circuit contacts 1, 2 and 4 and also contacts 6, 8 and b to give the circuit shown in Figure 3. In the fourth or last position the switch is arranged to short circuit contacts 1 and 5, contacts 2 and 3 and also contacts 8, 9 and b which will give the circuit of Figure 4.

The switch has been shown diagrammatically in Figure 6 in order that its function may be clearly understood. Any suitable construction of switch may be employed without departing from the scope of the present invention, one such construction comprising a rotary member carrying the longitudinally disposed shorting strips and co-operating with spaced tangentially arranged spring contact blades. Since it is essential to prevent leakages across the switch contacts from flowing through the current coil 13, the said switch device is preferably provided with one or more metal guard rings or strips (indicated diagrammatically at 150 in Figure 5) separating the shorting strips and contacts, these guard rings and the function of the same being known.

By suitably choosing the values of the various resistances employed in the intermediate and high ranges, the scale shape of the instrument on these ranges may easily be maintained constant and hence only a single scale need be marked on the scale plate for these three ranges. The scale shape for the low range where the unknown resistance is in parallel with the current coil, instead of in series with the same, will essentially be different and so it is necessary to mark a separate scale on the scale plate for this range.

Figure 7:
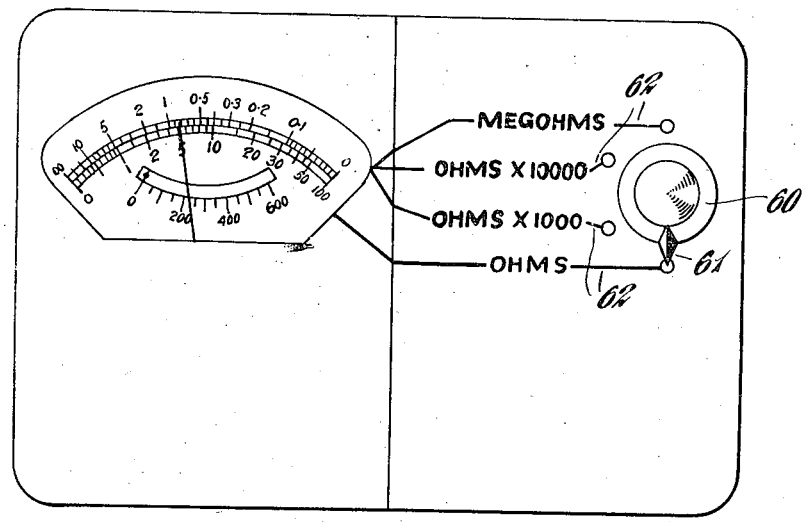
Figure 7 is a fragmentary plan view of the instrument casing showing the switch control knob.

According to a further feature of the present invention, which is intended to facilitate the ready appreciation of the range to which the instrument is set, the operating knob 60 of the single range changing switch (Fig. 7) is provided with a pointer or indicator 61 which not only indicates the range in question but also coincides with the end of one of a series of lines 62 which extends to the edge of the scale aperture adjacent the scale on which the reading is to be taken. Such lines may be marked in any suitable manner to indicate the range in question and the units in which the reading has to be taken such, for example, as by means of the words "ohms," "ohms×1000," "ohms×10,000" and "megohms" as shown. It will then be immediately apparent not only to which range the instrument is set but also which scale is to be read.

There is also preferably provided in the multi-range ohmmeter according to the present invention a voltmeter by means of which it is possible not only to ascertain whether the voltage applied to the unknown resistance is of the adequate value but also whether a voltage is applied to the circuit in which the measurement is to be made in order to prevent the instrument being accidentally damaged. Such a voltmeter 50 (Fig. 5) is connected between the high potential test terminal 11 and the common point of the crossed coils 13, 14 so that, when the operating button is not depressed and the blade spring contacts 41 are open, the voltmeter 50 is disconnected from the voltage supply of the instrument and effectively connected across the test terminals 10 and 11, whereby the existence of a voltage across the ends of the unknown resistance will be indicated immediately the unknown resistance is connected to the instrument. On the other hand, on the high range, when the operating button is depressed to close the blade spring contacts 41, the voltmeter 50 is connected across the high voltage supplied by the buzzer rectifier device 16 in series with the resistance A. The voltmeter will then show the value of the voltage supply, less the voltage drop across the resistance A, i. e., substantially the voltage applied to the unknown resistance.

Now it will be obvious that under various working conditions such a voltmeter 50 will be called upon to measure both alternating current and direct current voltages. Accordingly, the voltmeter 50 is connected across a bridge connected rectifier 51 so that it may read either direct current or alternating current voltages.

According to a further feature of the present invention, the voltmeter 50 is left permanently in circuit even when the resistance readings are being taken. In order to prevent the presence of the voltmeter 50, which acts as a shunt to the voltage supply system, having any effect on the scale shape, there is included in the voltmeter circuit a high resistance 52, say of the order of five megohms. Such a high series resistance will reduce the current flowing in the shunt circuit to such a low value that it will not cause an appreciable error on any of the intermediate ranges, when using the same scale as on the high range.

According to a still further feature of the present invention, a condenser 53 is shunted across the whole or a part of the high series resistance 52. It is convenient to shunt the condenser across such an amount of the series resistance that the ratio of unshunted to shunted resistance is between 8 and 10 to 1. This will be found to ensure a substantially correct reading on one scale both for A. C. and D. C. voltages on any commercial frequency. The purpose of this shunt condenser is to shunt a certain amount of current from the resistance on A. C. in order that the voltmeter may read the desired R. M. S. value instead of the mean voltage as would otherwise be the case.

Figure 8:
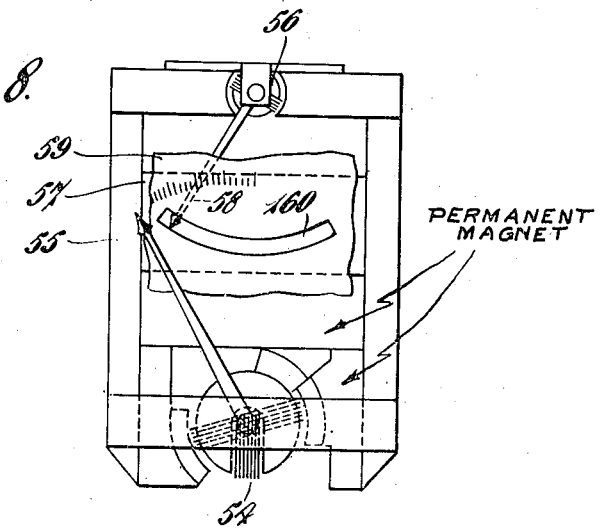
Figure 8 is a somewhat diagrammatic plan view of a convenient instrument structure for use in carrying out the present invention.

In practice the magnet structure for the moving coil voltmeter may be combined with the magnet structure for the moving coil ohmmeter and be arranged at the opposite end of the same. This will be appreciated on reference to Figure 8, in which the movement 54 of the moving coil ohmmeter is arranged at one end of the magnet structure 55, whilst the movement 56 of the moving coil voltmeter is arranged at the opposite end thereof. 57 is the permanent magnet preferably of a nickel-aluminium steel or nickel-aluminium-cobalt steel alloy. It is also convenient to arrange the moving coil voltmeter movement 56 so that its pointer 58 is directed towards the ohmmeter movement 54 and, in this case, the pointer 58 may be located under the ohmmeter scale plate 59 and be visible through a transparent graduated arc 160 in such scale plate. This will give a compact instrument.

It will be readily appreciated that although the present invention has been more particularly described in connection with a four-range direct reading ohmmeter, it is equally applicable to an ohmmeter adapted to read three ranges or more than four ranges by appropriate arrangement of the switching.

Figure 4:
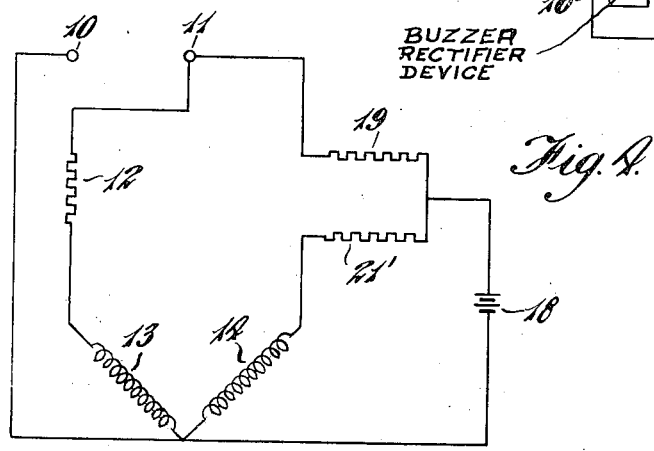

If desired, the shunt circuit arrangement shown in Figure 4 used for low range may also be used for an intermediate range, a high voltage being employed instead of the low voltage.

We claim:

1. In an electrical resistance measuring system of the class described, a low voltage source; a buzzer rectifier having input and output circuits; input circuit connections between said low voltage source and said buzzer rectifier comprising a switch and a pair of intermediate terminals; a first terminal and a second terminal adapted to be connected to the resistance to be measured; a crossed coil moving coil system comprising a current coil and a pressure coil; a third terminal connected to the junction point of said current coil and pressure coil; a fourth terminal connected to the opposite end of said current coil and a resistance between said fourth terminal and said current coil; said pressure coil being shunted across said buzzer rectifier circuit and including a second resistance in series therewith in said shunt circuit; a shunt line connected to said third terminal with a third resistance terminating in a fifth terminal; a fourth resistance inserted between said first terminal and said output circuit of said buzzer rectifier; a second switch mechanically interconnected with said first switch operable therewith disposed between said last-mentioned resistance and first terminal; a sixth terminal connected to the junction of said second switch and said last-mentioned resistance; auxiliary terminals tapped from said last-mentioned resistance and another auxiliary terminal tapped from said second resistance; and a single range-changing switch for modifying the circuit connections to adapt the instrument to a plurality of ranges of measurement which comprises a member for bridging the second and fourth terminals and another member for bridging said pair of intermediate terminals to complete the input circuit and to connect the output circuit of said buzzer rectifier through said first and second switches to the first and second terminals with the unknown resistance connected thereto for high values of resistance; a member for bridging said second terminal with at least said fourth terminal, and other connections for connecting one of said first auxiliary terminals to said second auxiliary terminal and one of said intermediate terminals to complete the energizing circuit of said low voltage source through said first and second switches with reduced values of said second and fourth resistances to the first and second terminals with the unknown resistance connected thereto for intermediate values of resistance; and a member for bridging said fourth and sixth terminals, another member for bridging said second and third terminals and other connections for connecting another one of said first auxiliary terminals to said second auxiliary terminal and said one intermediate terminal to complete the energizing circuit of said low voltage source through said first and second switches with reduced values of said second and fourth resistances to the first and second terminals with the current coil in parallel to the unknown resistance connected between the first and second terminals for measuring low values of resistance.

2. In an electrical resistance measuring system of the class described, a low voltage source; a buzzer rectifier having input and output circuits; input circuit connections between said low voltage source and said buzzer rectifier comprising a switch and a pair of intermediate terminals; a first terminal and a second terminal adapted to be connected to the resistance to be measured; a crossed coil moving coil system comprising a current coil and a pressure coil; a third terminal connected to the junction point of said current coil and pressure coil; a fourth terminal connected to the opposite end of said current coil and a resistance between said fourth terminal and said current coil; said pressure coil being shunted across said buzzer rectifier circuit and including a second resistance in series therewith in said shunt circuit; a shunt line connected to said third terminal with a third resistance terminating in a fifth terminal; a fourth resistance inserted between said first terminal and said output circuit of said buzzer rectifier; a second switch mechanically interconnected with said first switch operable therewith disposed between said last-mentioned resistance and first terminal; a sixth terminal connected to the junction of said second switch and said last-mentioned resistance; auxiliary terminals tapped from said last-mentioned resistance and another auxiliary terminal tapped from said second resistance; and a single range-changing switch for modifying the circuit connections to adapt the instrument to a plurality of ranges of measurement which comprises a member for bridging the second and fourth terminals and another member for bridging said pair of intermediate terminals to complete the input circuit and to connect the output circuit of said buzzer rectifier through said first and second switches to the first and second terminals with the unknown resistance connected thereto for high values of resistance; a member for bridging said second and fourth terminals, and other connections for connecting one of said first auxiliary terminals to said second auxiliary terminal and one of said intermediate terminals to complete the energizing circuit of said low voltage source through said first and second switches with reduced values of said second and fourth resistances to the first and second terminals with the unknown resistance connected thereto for intermediate values of resistance; and a member for bridging said fourth and sixth terminals, another member for bridging said second and third terminals and other connections for connecting another one of said first auxiliary terminals to said second auxiliary terminal and said one intermediate terminal to complete the energizing circuit of said low voltage source through said first and second switches with reduced values of said second and fourth resistances to the first and second terminals with the current coil in parallel to the unknown resistance connected between the first and second terminals for measuring low values of resistance.

3. In an electrical resistance measuring system of the class described, a low voltage source; a buzzer rectifier having input and output circuits; input circuit connections between said low voltage source and said buzzer rectifier comprising a switch and a pair of intermediate terminals; a first terminal and a second terminal adapted to be connected to the resistance to be measured; a crossed coil moving coil system comprising a current coil and a pressure coil; a third terminal connected to the junction point of said current coil and pressure coil; a fourth terminal connected to the opposite end of said current coil and a resistance between said fourth terminal and said current coil; said pressure coil being shunted across said buzzer rectifier circuit and including a second resistance in series therewith in said shunt circuit; a shunt line connected to said third terminal with a third resistance terminating in a fifth terminal; a fourth resistance inserted between said first terminal and said output circuit of said buzzer rectifier; a second switch mechanically interconnected with said first switch operable therewith disposed between said last-mentioned resistance and first terminal; a sixth terminal connected to the junction of said second switch and said last-mentioned resistance; auxiliary terminals tapped from said last-mentioned resistance and another auxiliary terminal tapped from said second resistance; and a single range-changing switch for modifying the circuit connections to adapt the instrument to a plurality of ranges of measurement which comprises a member for bridging the second and fourth terminals and another member for bridging said pair of intermediate terminals to complete the input circuit and to connect the output circuit of said buzzer rectifier through said first and second switches to the first and second terminals with the unknown resistance connected thereto for high values of resistance; a member for bridging said second, fourth and fifth terminals, and other connections for connecting one of said first auxiliary terminals to said second auxiliary terminal and one of said intermediate terminals to complete the energizing circuit of said low voltage source through said first and second switches with reduced values of said second and fourth resistances to the first and second terminals with the unknown resistance connected thereto for intermediate values of resistance; and a member for bridging said fourth and sixth terminals, another member for bridging said second and third terminals and other connections for connecting another one of said first auxiliary terminals to said second auxiliary terminal and said one intermediate terminal to complete the energizing circuit of said low voltage source through said first and second switches with reduced values of said second and fourth resistances to the first and second terminals with the current coil in parallel to the unknown resistance connected between the first and second terminals for measuring low values of resistance.

4. In an electrical resistance measuring system of the class described, a low voltage source; a buzzer rectifier having input and output circuits; input circuit connections between said low voltage source and said buzzer rectifier comprising a switch and a pair of intermediate terminals; a first terminal and a second terminal adapted to be connected to the resistance to be measured; a crossed coil moving coil system comprising a current coil and a pressure coil; a third terminal connected to the junction point of said current coil and pressure coil; a fourth terminal connected to the opposite end of said current coil and a resistance between said fourth terminal and said current coil; said pressure coil being shunted across said buzzer rectifier circuit and including a second resistance in series therewith in said shunt circuit; a shunt line connected to said third terminal with a third resistance terminating in a fifth terminal; a fourth resistance inserted between said first terminal and said output circuit of said buzzer rectifier; a second switch mechanically interconnected with said first switch operable therewith disposed between said last-mentioned resistance and first terminal; a sixth terminal connected to the junction of said second switch and said last-mentioned resistance; auxiliary terminals tapped from said last-mentioned resistance and another auxiliary terminal tapped from said second resistance; and a single range changing switch for modifying the circuit connections to adapt the instrument to a plurality of ranges of measurement which comprises a member for bridging the second and fourth terminals and another member for bridging said pair of intermediate terminals to complete the input circuit and to connect the output circuit of said buzzer rectifier through said first and second switches to the first and second terminals with the unknown resistance connected thereto for high values of resistance; a member for bridging said second and fourth terminals, and other connections for connecting one of said first auxiliary terminals to said second auxiliary terminal and one of said intermediate terminals to complete the energizing circuit of said low voltage source through said first and second switches with reduced values of said second and fourth resistances to the first and second terminals with the unknown resistance connected thereto for a high range of intermediate values of resistance; a member for bridging said second, fourth and fifth terminals, and other connections for connecting another one of said first auxiliary terminals to said second auxiliary terminal and said one intermediate terminal to complete the energizing circuit of said low voltage source through said first and second switches with reduced values of said second and fourth resistances to the first and second terminals with the unknown resistance connected thereto for a low range of intermediate values of resistance; and a member for bridging said fourth and sixth terminals, another member for bridging said second and third terminals and other connections for connecting another one of said first auxiliary terminals to said second auxiliary terminal and said one intermediate terminal to complete the energizing circuit of said low voltage source through said first and second switches with reduced values of said second and fourth resistances to the first and second terminals with the current coil in parallel to the unknown resistance connected between the first and second terminals for measuring low values of resistance.

HUGH SUTHERLAND MACADIE.
HANS FRAENKEL.